(12) United States Patent
Yoshikawa et al.

(10) Patent No.: US 9,043,081 B2
(45) Date of Patent: May 26, 2015

(54) ELECTRONIC CONTROL DEVICE AND VEHICLE CONTROL SYSTEM

(75) Inventors: Taku Yoshikawa, Shioya-gun (JP);
Daisuke Hoshi, Utsunomiya (JP);
Shinichi Daibo, Utsunomiya (JP);
Yuichi Kobata, Utsunomiya (JP)

(73) Assignees: KEIHIN CORPORATION (JP);
HONDA MOTOR CO., LTD. (JP)

(*) Notice: Subject to any disclaimer, the term of this patent is extended or adjusted under 35 U.S.C. 154(b) by 0 days.

(21) Appl. No.: 13/611,086

(22) Filed: Sep. 12, 2012

(65) Prior Publication Data

US 2013/0066519 A1 Mar. 14, 2013

(30) Foreign Application Priority Data

Sep. 14, 2011 (JP) ................................ 2011-200757

(51) Int. Cl.
| | |
|---|---|
| G06F 7/00 | (2006.01) |
| G06F 1/26 | (2006.01) |
| G06F 1/32 | (2006.01) |
| G06F 1/00 | (2006.01) |
| B60L 1/00 | (2006.01) |
| B60R 16/03 | (2006.01) |
| H02J 9/00 | (2006.01) |

(52) U.S. Cl.
CPC . B60L 1/00 (2013.01); B60R 16/03 (2013.01); H02J 9/005 (2013.01); B60L 2240/80 (2013.01); Y02T 10/92 (2013.01)

(58) Field of Classification Search
CPC ............... G05B 2219/21169; G05B 19/0428; B60L 1/00; B60L 2240/80; H02J 9/005; B60R 16/03

USPC ............................................ 701/36; 713/323
See application file for complete search history.

(56) References Cited

U.S. PATENT DOCUMENTS

| | | | |
|---|---|---|---|
| 6,232,674 B1* | 5/2001 | Frey et al. ..................... 307/10.1 |
| 2002/0021108 A1* | 2/2002 | Suzuki et al. .................. 320/132 |
| 2002/0193935 A1* | 12/2002 | Hashimoto et al. ............ 701/110 |
| 2005/0085967 A1* | 4/2005 | Mitsueda et al. ................ 701/36 |
| 2005/0212491 A1* | 9/2005 | Colombo et al. .............. 320/150 |
| 2007/0288102 A1* | 12/2007 | Korzin ............................. 700/22 |
| 2011/0270490 A1* | 11/2011 | Katou et al. ..................... 701/36 |

FOREIGN PATENT DOCUMENTS

| | | |
|---|---|---|
| JP | 2000032603 A | 1/2000 |
| JP | 2001-103615 A | 4/2001 |
| JP | 2004243859 A | 9/2004 |
| JP | 2005020570 A | 1/2005 |
| JP | 2009248822 A | 10/2009 |
| JP | 2010263733 A | 11/2010 |

OTHER PUBLICATIONS

Japanese Notice of Reasons for Rejection corresponding to Application Number: 2011-200757; Date of Mailing: Apr. 1, 2015, with English translation.

* cited by examiner

*Primary Examiner* — Calvin Cheung
*Assistant Examiner* — Paula L Schneider
(74) *Attorney, Agent, or Firm* — Cantor Colburn LLP

(57) ABSTRACT

The present invention provides an electronic control device including a processing unit having a function of shifting to a sleep mode in which the processing unit is adapted to start up from the sleep mode according to occurrence statuses of one or more startup factors, and shift to the sleep mode according to a system power supply voltage.

4 Claims, 4 Drawing Sheets

ELECTRONIC CONTROL DEVICE AND VEHICLE CONTROL SYSTEM

BACKGROUND OF THE INVENTION

The present invention relates to an electronic control device and a vehicle control system.

The present application claims priority based on Japanese Patent Application No. 2011-200757 filed in Japan on Sep. 14, 2011, the disclosures of which are incorporated herein by reference in their entirety.

FIELD OF THE INVENTION

Japanese Patent Application Laid-open No. 2001-103615 discloses a technique in which a microcomputer embedded in a control unit in an electric car is activated, or is changed into a sleep mode according to occurrence statuses of plural activation factors.

More specifically, the microcomputer starts up if detecting activation of ignition switch or starting of battery charging with a battery charger before a certain period of time elapses from reception of input of an interrupt signal during the sleep mode, whereas the microcomputer maintains the sleep mode if not detecting the activation or starting.

DESCRIPTION OF THE RELATED ART

In the case where the microcomputer or central processing unit (CPU) starts up or is set to the sleep mode according to the occurrence statuses of the plural startup factors as described in the related art, the startup or sleep mode of the microcomputer has to be determined depending on the startup factors, which makes the process complicated. This slows down shifting to the sleep mode, possibly reducing a power saving effect.

The present invention has been made in view of the circumstances described above, and an object of the present invention is to rapidly shift, to the sleep mode, a microcomputer, CPU or other processing unit having a function of shifting to the sleep mode, thereby improving the power saving effect.

SUMMARY OF THE INVENTION

The present invention employs the following configurations to solve the above problems.
(1) A first aspect of the the present invention provides an electronic control device including a processing unit having a function of shifting to a sleep mode, in which the processing unit is adapted to start up from the sleep mode according to occurrence statuses of one or more startup factors, and shift to the sleep mode according to a system power supply voltage.
(2) According to the electronic control device described in (1) above, this electronic control device may further include a power supply monitoring unit that outputs a signal indicating a determination result of whether the system power supply voltage is not more than a threshold value, and the processing unit may be adapted to shift to the sleep mode if the system power supply voltage is detected to be not more than the threshold value on the based on the output signal from the power supply monitoring unit.
(3) According to the electronic control device described in (2) above, the processing unit may be adapted to perform sampling of the output signal from the power supply monitoring unit at constant intervals, and shift to the sleep mode if the number of times that the system power supply voltage is detected to be not more than the threshold value reaches a predetermined number of times.
(4) A second aspect of the the present invention provides a vehicle control system for use in a vehicle having a motor as a power source, the system including: a high-voltage battery for driving the motor; a connection-destination switching unit that switches a connection destination of the high-voltage battery; and the electronic control device described in any one of (1) to (3) above that controls the connection-destination switching unit to switch the connection destination of the high-voltage battery, thereby controlling charge and discharge of the high-voltage battery.

DETAILED DESCRIPTION OF THE INVENTION

Hereinbelow, an embodiment of the present invention will be described with reference to the drawings.

Figure 1:
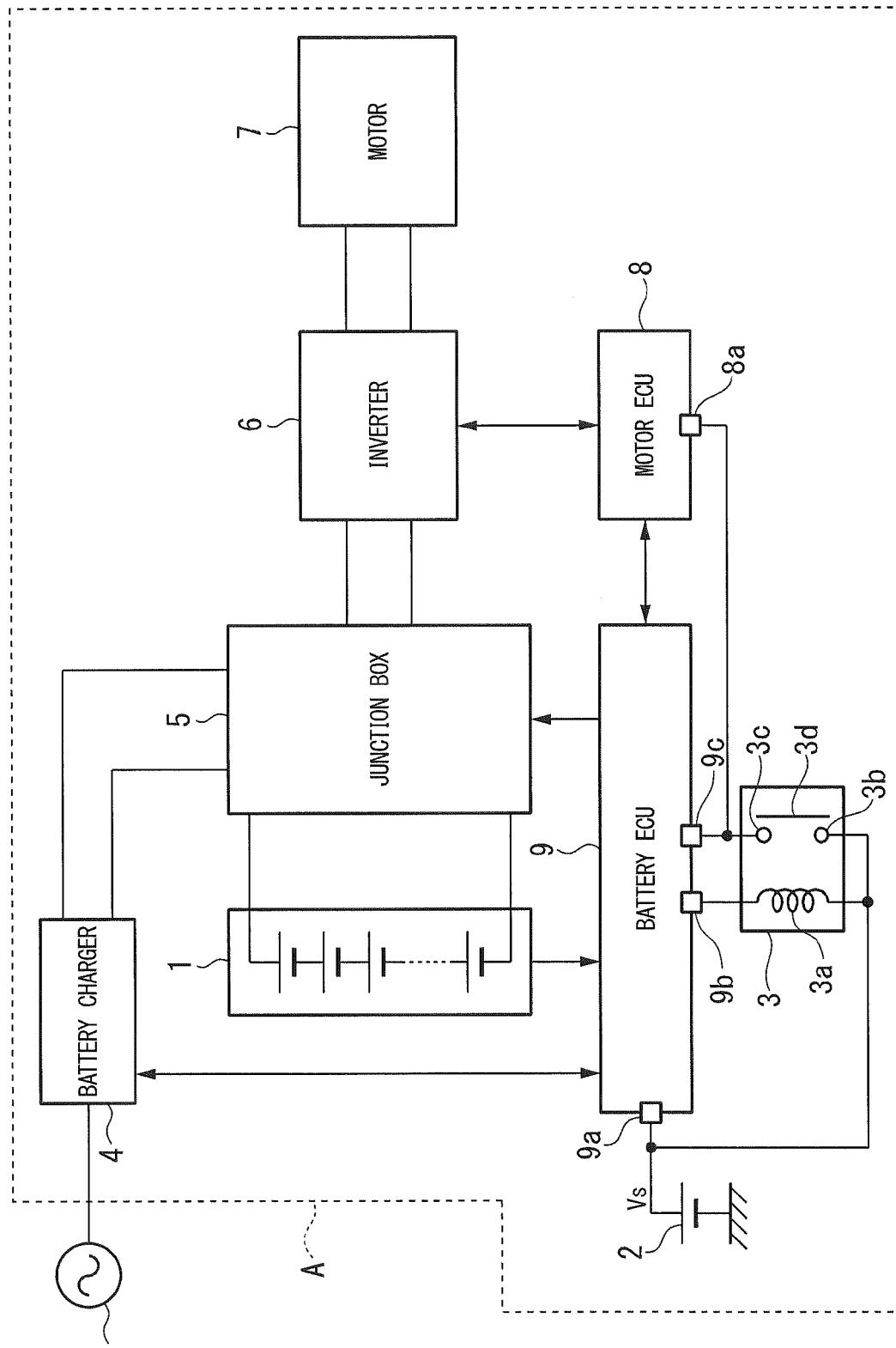
FIG. 1 is a schematic configuration view illustrating a vehicle control system A according to this embodiment.

FIG. 1 is a schematic configuration view illustrating a vehicle control system A according to this embodiment. The vehicle control system A is provided, for example, to an electric car, plug-in hybrid car or other vehicles having a motor as a power source, and mainly controls the motor, and charging/discharging of a high-voltage battery. The vehicle control system A includes a high-voltage battery 1, a low-voltage battery 2, a power supply relay 3, a battery charger 4, a junction box 5, an inverter 6, a motor 7, a motor electric control unit (motor ECU) 8, and a battery ECU 9.

The high-voltage battery 1 is formed by plural battery cells such as lithium-ion battery cells and nickel-metal hydride cells connected in series to each other, and is, for example, a battery for driving the motor, which outputs high DC voltage, for example, of several hundreds voltage. This high-voltage battery 1 has two terminals (positive terminal and negative terminal) each connected to the junction box 5.

The low-voltage battery 2 is provided for supplying system power supply voltage Vs (for example, 12 volts) to the motor ECU 8 and the battery ECU 9. This low-voltage battery 2 has a positive terminal connected directly with a power supply terminal 9a of the battery ECU 9, and connected to a power supply terminal 8a of the motor ECU 8 through the power supply relay 3. Note that the low-voltage battery 2 has a negative terminal connected to the earth of a vehicle body.

Under the control by the battery ECU 9, the power supply relay 3 connects or disconnects a connection path between the positive terminal of the low-voltage battery 2 and the power supply terminal 8a of the motor ECU 8. The power supply relay 3 includes a coil 3a, a first contact 3b, a second contact 3c, and a movable contact 3d.

The coil 3a has one end connected to a positive terminal of the low-voltage battery 2 and the other end connected to a relay connection terminal 9b of the battery ECU 9. The first contact 3b is connected to one end of the coil 3a, more specifically, to the positive terminal of the low-voltage battery 2. The second contact 3c is connected to a monitor terminal 9c of the battery ECU 9 and the power supply terminal 8a of the motor ECU 8. The movable contact 3d is normally in a standby state and located at a position away from the first contact 3b and the second contact 3c. Upon electric current being applied to the coil 3a, an electromagnetic force occurs, and the first contact 3b and the second contact 3c are drawn to and brought into contact with the movable contact 3d. This makes the first contact 3b and the second contact 3c electrically conducted state.

The battery charger 4 is a charging circuit connected to an alternating current power supply B disposed outside of the vehicle at the time of charging the high-voltage battery 1. Under the control by the battery ECU 9, the battery charger 4 converts AC voltage supplied from an AC power supply B into a direct current with a predetermined voltage value, and outputs the direct current to the junction box 5.

Under the control by the battery ECU 9, the junction box 5 (connection-destination switching unit) switches the connection destination of both terminals of the high-voltage battery 1 into both output terminals of the battery charger 4 at the time of charging whereas switching into both input terminals of the inverter 6 at the time of discharging (at the time of driving the motor 7).

The inverter 6 operates switching according to pulse width modulation (PWM) signals inputted from the motor ECU 8, and converts a high DC voltage inputted from the high-voltage battery 1 through the junction box 5 into an AC voltage with a predetermined frequency to output the AC voltage to the motor 7. The motor 7 is, for example, a three-phase brushless motor used as the power source of the vehicle, and rotates according to the AC voltage supplied from the inverter 6.

The motor ECU 8 is connected to the battery ECU 9 in a manner that can communicate with each other. Upon receiving a request from the battery ECU 9 to drive the motor 7 (upon the connection destination of the high-voltage battery 1 being switched to the inverter 6), the motor ECU 8 generates a PWM signal to be supplied to the inverter 6. Note that the motor ECU 8 is connected to at least one higher-order ECU (not illustrated) in a manner that can communicate with each other, and changes a duty ratio and frequency of the PWM signal according to driving information (for example, the amount of accelerator operated) sent from the higher-order ECU to control the rotation state of the motor 7.

The battery ECU 9 is an electronic control device that controls charging and discharging of the high-voltage battery 1, and controls the junction box 5 to switch the connection destination of the high-voltage battery 1 into the battery charger 4 at the time of charging, and into the inverter 6 at the time of discharging. This battery ECU 9 controls the battery charger 4 while monitoring the voltage state of the high-voltage battery 1 at the time of charging the high-voltage battery 1 so as to charge the high-voltage battery 1 to an appropriate voltage value.

Further, the battery ECU 9 has a function of sending a request for the motor ECU 8 to drive the motor 7 upon changing of the connection destination of the high-voltage battery 1 into the inverter 6, and a function of switching between supply and stop of supply of the system power supply voltage Vs (output voltage of the low-voltage battery 2) to the motor ECU 8 by controlling the power supply relay 3 to make or break the connection.

Figure 2:
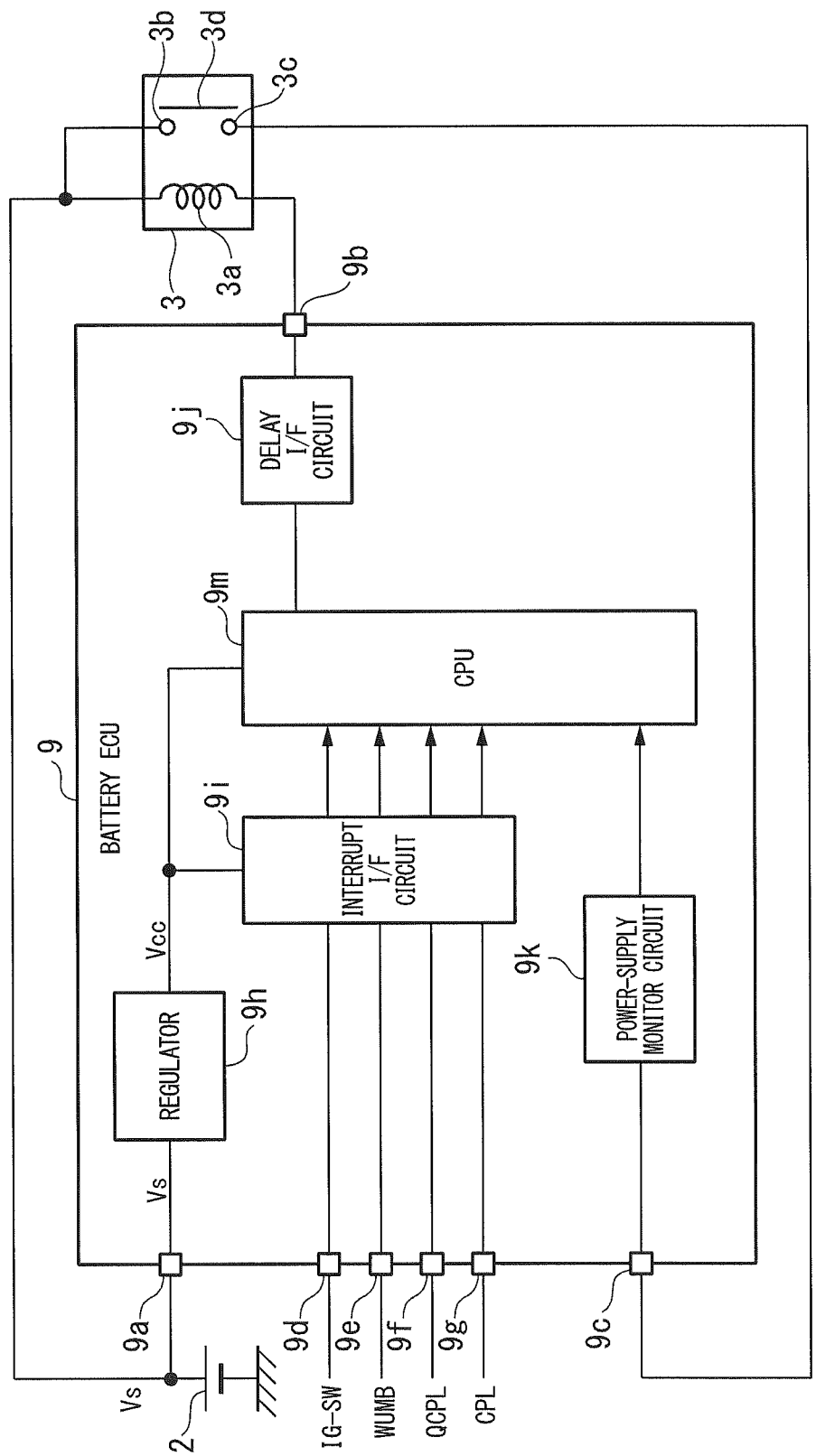
FIG. 2 is a detailed configuration view illustrating a battery ECU 9 according to this embodiment.

FIG. 2 is a detailed configuration view illustrating the battery ECU 9. As illustrated in FIG. 2, the battery ECU 9 includes a power supply terminal 9a connected to the low-voltage battery 2 described above, a relay connection terminal 9b connected to the coil 3a of the power supply relay 3, a monitor terminal 9c connected to the second contact 3c of the power supply relay 3, a first interrupt terminal 9d, a second interrupt terminal 9e, a third interrupt terminal 9f, a fourth interrupt terminal 9g, a regulator 9h, an interrupt I/F circuit 9i, a delay I/F circuit 9j, a power-supply monitor circuit 9k, and a CPU 9m.

The first interrupt terminal 9d is connected to an ignition switch (not illustrated) provided at a predetermined position of the vehicle, and functions as an external input terminal for sending signals indicating on/off state of the ignition switch to the interrupt I/F circuit 9i as a first interrupt signal IG-SW.

The second interrupt terminal 9e is connected to a communication device (not illustrated) provided at a predetermined position of the vehicle, and functions as an external input terminal for sending, to the interrupt I/F circuit 9i, signals indicating reception of an instruction to activate the battery ECU 9 (more specifically, CPU 9m) from, for example, a key or mobile terminal of a user as a second interrupt signal WUMB.

The third interrupt terminal 9f is connected to a rapid charging switch (not illustrated) provided at a predetermined position in the vehicle, and functions as an external input terminal for sending, to the interrupt I/F circuit 9i, signals indicating on/off state of the rapid charging switch as a third interrupt signal QCPL.

The fourth interrupt terminal 9g is connected to a normal charging switch (not illustrated) provided at a predetermined position in the vehicle, and functions as an external input terminal for sending, to the interrupt I/F circuit 9i, signal indicating on/off state of the normal charging switch as a fourth interrupt signal CPL.

The regulator 9h is a constant-voltage power supply circuit that uses the system power supply voltage Vs (output voltage from low-voltage battery 2) inputted through the power supply terminal 9a to generate internal power supply voltage Vcc (for example, 5 volts) for each electronic component in the battery ECU 9. The internal power supply voltage Vcc generated by the regulator 9h is supplied through a power supply line to the interrupt I/F circuit 9i, the delay I/F circuit 9j, the power-supply monitor circuit 9k, and the CPU 9m.

The interrupt I/F circuit 9i receives the externally inputted interrupt signals IG-SW, WUMB, QCPL, and CPL from the respective interrupt terminals 9d, 9e, 9f and 9g to output them to the CPU 9m. The delay I/F circuit 9j connects the relay connection terminal 9b, which is normally in the electrically floating state, to the ground in accordance with control by the CPU 9m.

More specifically, when the relay connection terminal 9b is in the electrically floating state, any current does not pass through the coil 3a of the power supply relay 3, which makes the power supply relay 3 remain in the off state. Upon the relay connection terminal 9b being connected to the ground, the electric current passes through the coil 3a, which makes the power supply relay 3 switched to the on-state. After the power supply relay 3 is switched into the on-state, the system power supply voltage Vs is supplied to the motor ECU 8 (see FIG. 1) as well as to the monitor terminal 9c of the battery ECU 9.

The power-supply monitor circuit 9k (power supply monitor unit) determines whether or not the system power supply voltage Vs inputted through the monitor terminal 9c is less than or equal to the threshold value (for example, less than or equal to 6 volts), and outputs a signal indicating the determination results to the CPU 9m. More specifically, the power-supply monitor circuit 9k outputs a high-level signal to the CPU 9m if the system power supply voltage Vs exceeds the threshold value, and outputs a low-level signal to the CPU 9m if the system power supply voltage Vs is less than or equal to the threshold value. Note that the power-supply monitor circuit 9k having the function as described above can be easily realized by a comparator.

The CPU 9m (processing unit) is a central processing unit that carries out processes necessary for controlling the charging and discharging of the high-voltage battery 1 in accordance with a control program stored in a built-in memory. More specifically, the CPU 9m controls the on/off of the power supply relay 3, controls the battery charger 4, controls the junction box 5, and sends, to the motor ECU 8, a request to drive the motor 7.

Further, the CPU 9m has a function of shifting to the sleep mode. This CPU 9m receives, as startup factors, interrupt signals IG-SW, WUMB, QCPL and CPL inputted from the interrupt I/F circuit 9i, and starts up from the sleep mode in accordance with the occurrence statuses of these startup factors (state of the interrupt signals), or shifts to the sleep mode depending on the system power supply voltage Vs.

Next, with reference to FIG. 3A and FIG. 3B, a detailed description will be made of an operation of starting up the CPU 9m from the sleep mode, and an operation of shifting to the sleep mode.

First, it is assumed that the CPU 9m is in the sleep mode. During the sleep mode, the CPU 9m receives, as the startup factors, interrupt signals IG-SW, WUMB, QCPL and CPL inputted from the interrupt I/F circuit 9i, and monitors the occurrence statuses of these startup factors (states of the interrupt signals).

If detecting that at least one of the interrupt signals IG-SW, WUMB, QCPL and CPL is changed into the high level, the CPU 9m determines that the startup factor takes place, and starts up (returns) from the sleep mode. In other words, the CPU 9m starts up from the sleep mode upon the ignition switch being turned on, receiving the order to start up the battery ECU 9 from, for example, the key or mobile terminal of the user, the rapid charging switch being turned on, or the normal charging switch being turned on.

Figure 3A:
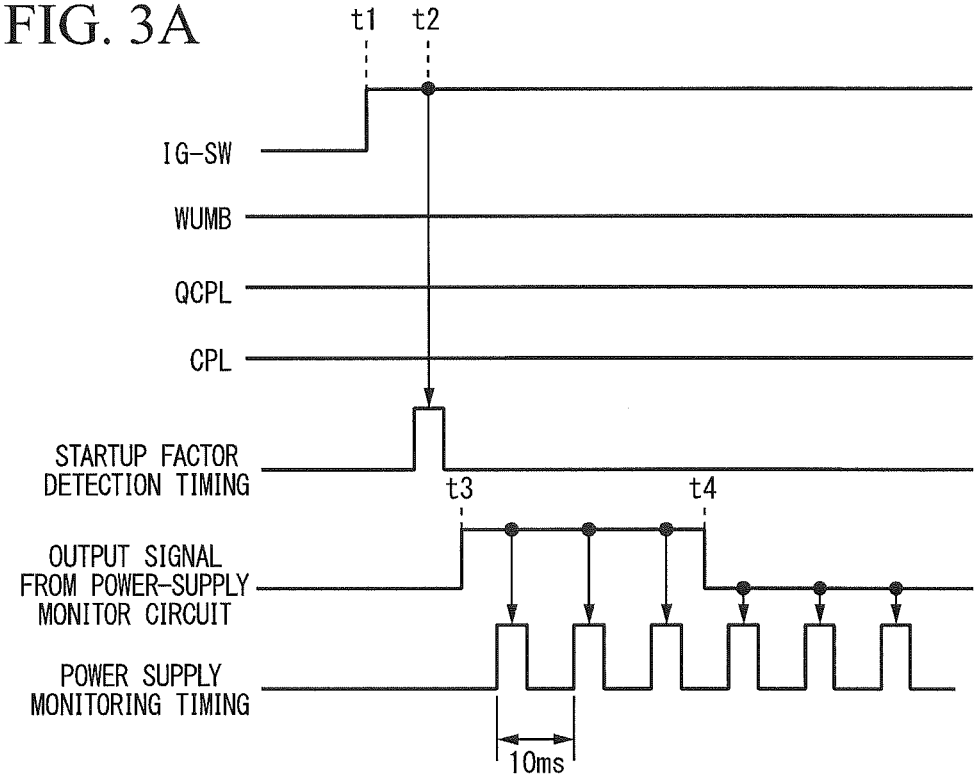
FIG. 3A is a chart illustrating operation timings of a CPU 9m embedded in the battery ECU 9.

For example, it is assumed that the first interrupt signal IG-SW is changed into the high level (the ignition switch is turned on) at a time t1 during the time when the CPU 9m is being in the sleep mode, as illustrated in a timing chart in FIG. 3A. During the sleep mode, the CPU 9m reads the state (level) of the interrupt signals IG-SW, WUMB, QCPL and CPL at certain time intervals to monitor whether there is any change of interrupt signals into the high level.

Upon detecting that the first interrupt signal IG-SW is changed into the high level at a time t2 illustrated in FIG. 3A, the CPU 9m determines that the startup factor takes place, and starts up from the sleep mode to turn on the power supply relay 3 through the delay I/F circuit 9j. This causes the system power supply voltage Vs to be supplied from the low-voltage battery 2 to the motor ECU 8, making the motor ECU 8 changed into the operable state.

As described above, the CPU 9m starts up from the sleep mode, and turns on the power supply relay 3, thereby performing a process necessary for controlling the charging and discharging of the high-voltage battery 1 in accordance with the control program stored in the built-in memory. For example, in the case where receiving, from the higher-order controlling device, an instruction to supply electric power to the motor 7, the CPU 9m controls the junction box 5 to switch the connection destination of the high-voltage battery 1 to the inverter 6, and requests the motor ECU 8 to drive the motor 7.

Further, in the case where the startup factor is the turning-on of the rapid charging switch (level change of QCPL) or is the turning-on of the normal charging switch (level change of CPL), the CPU 9m controls the junction box 5 to switch the connection destination of the high-voltage battery 1 to the battery charger 4, and controls the battery charger 4 while monitoring the voltage state of the high-voltage battery 1 so as to charge the high-voltage battery 1 to an appropriate voltage value.

When the power supply relay 3 is switched to the on-state, the system power supply voltage Vs is inputted to the power-supply monitor circuit 9k, whereby the high-level signal is outputted from the power-supply monitor circuit 9k to the CPU 9m (see time t3 in FIG. 3A). When the power supply relay 3 is switched to the off-state and the system power supply voltage Vs becomes less than or equal to the threshold value (for example, 6 volts or lower), the low-level signal is outputted from the power-supply monitor circuit 9k to the CPU 9m (see time t4 in FIG. 3A).

After detecting the occurrence of the startup factor and starting up from the sleep mode, the CPU 9m performs sampling of the output signal of the power-supply monitor circuit 9k at certain intervals (for example, 10 ms interval). If the number of times that the system power supply voltage Vs is detected to be less than or equal to the threshold value (the number of times that the output signal of the power-supply monitor circuit 9k is detected to be the low level) reaches a predetermined number of times, the CPU 9m shifts to the sleep mode. The predetermined number of times is set for the purpose, for example, of determining whether the voltage drop is due to a momentary voltage change or due to the drop of the power supply voltage.

Figure 3B:
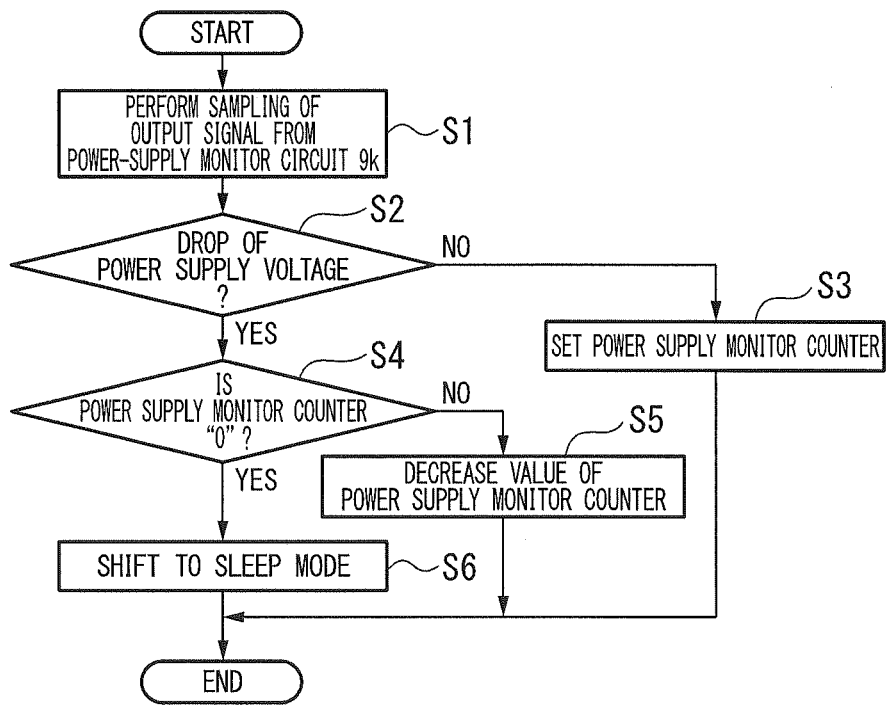
FIG. 3B is a flowchart showing a process of determining shift to sleep mode.

More specifically, after detecting the occurrence of the startup factor and starting up from the sleep mode, the CPU 9m repeats a process of determining the sleep shifting shown in the flowchart in FIG. 3B at certain intervals (for example, 10 ms interval). As shown in FIG. 3B, at the start of the process of determining the sleep shifting at this time, the CPU 9m first performs sampling to the output signal from the power-supply monitor circuit 9k (step S1), and determines whether the system power supply voltage Vs is less than or equal to the threshold value, in other words, determines whether the output signal from the power-supply monitor circuit 9k is the low level (step S2).

If determining to be "No" in step S2 (if the output signal from the power-supply monitor circuit 9k is the high level), the CPU 9m sets the value of the power supply monitor counter to a predetermined value (for example, "5"), and terminates the process of determining the sleep shifting at this time (step S3). If determining to be "YES" in step S2 (if the output signal of the power-supply monitor circuit 9k is the low level), the CPU 9m determines whether the value of the power supply monitor counter is "0" or not, in other words, whether the number of times that the system power supply voltage Vs is determined to be less than or equal to the threshold value (the number of times that the output signal of the power-supply monitor circuit 9k is determined to be the low level) reaches the predetermined number of times (for example, 5 times) (step S4).

If determining to be "No" in step S4, in other words, the number of times that the system power supply voltage Vs is detected to be less than or equal to the threshold value does not reach the predetermined number of times, the CPU 9m decreases the value of the power supply monitor counter ("one" is subtracted from the value of the power supply monitor counter to set the thus obtained value as a new value of the power supply monitor counter), and terminates the process of determining the sleep shifting at this time (step S5).

On the other hand, if detecting to be "YES" in step S4 described above, in other words, the number of times that the system power supply voltage Vs is determined to be less than or equal to the threshold value reach the predetermined number of times, the CPU 9m shifts to the sleep mode, and terminates the process of determining the sleep shift at this time (step S6). Note that, after shifting to the sleep mode, the CPU 9m stops performing the process of determining the sleep shifting illustrated in FIG. 3B, and only performs the process of monitoring the occurrence statuses of the startup factor (state of each of the interrupt signals) as described above.

According to the embodiments as described above, the CPU 9m having the shifting function to the sleep mode can be shifted rapidly to the sleep mode regardless of the occurrence statuses of the plural startup factors, so that it is possible to improve the power saving effects.

It should be noted that the present invention is not limited to the embodiments described above, and various modifications as described below may be possible.

(1) In the embodiments above, the battery ECU 9 that controls charging and discharging of the high-voltage battery 1 has been described as an example of the electronic control device according to the present invention. However, the present invention is not limited to this, and may be extensively applied to electronic control devices including a processing unit having the function of shifting to the sleep mode. Further, the processing unit having the function of shifting to the sleep mode is not limited to the CPU 9m, and may include a microcomputer or other processing units.

(2) In the embodiments above, a description has been made, as an example, of a case where the CPU 9m performs sampling of the output signals of the power-supply monitor circuit 9k at certain intervals, and shifts to the sleep mode if the number of times that the system power supply voltage Vs is detected to be less than or equal to the threshold value reaches the predetermined number of times. However, it may be possible to employ a configuration in which the CPU 9m shifts to the sleep mode at a point in time when the system power supply voltage Vs is detected to be less than or equal to the threshold value (at a point in time when the output signal of the power-supply monitor circuit 9k changes from the high level into the low level).

(3) In the embodiments above, a description has been made, as an example, of the vehicle control system A for use in an electric car, a plug-in hybrid car or other vehicle in which the high-voltage battery 1 can be charged externally. However, the present invention is not limited to this. The present invention may be applied to a vehicle control system provided to a hybrid car or other vehicle including an engine and a motor as a power source and having the high-voltage battery 1 that cannot be externally charged.

Figure 4:
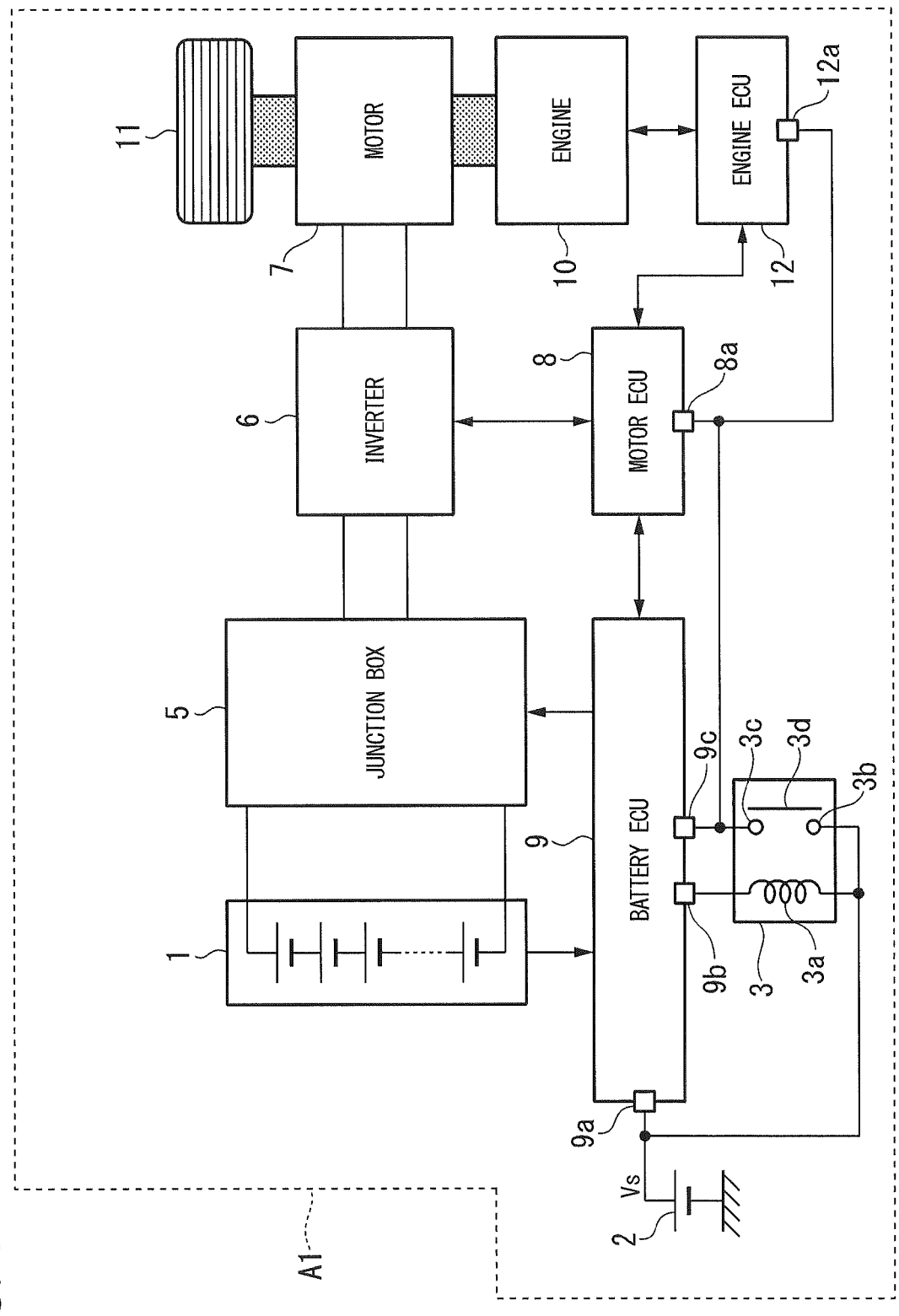
FIG. 4 is a diagram illustrating a modification example of the vehicle control system A according to this embodiment.

FIG. 4 is a configuration schematic view illustrating an example of the vehicle control system A1 for use in a hybrid car. In FIG. 4, the constituent elements same as those of the vehicle control system A are denoted by the same reference characters. As illustrated in FIG. 4, the vehicle control system A1 is a hybrid system employing a parallel system in which the motor 7 and an engine 10 are linked to each other in the same axis, and both of the motor 7 and the engine 10 are used as the power source of a wheel 11. Note that the vehicle control system A1 may be a hybrid system employing a system other than the parallel system.

The engine 10 includes an engine ECU 12 that controls, for example, the amount of fuel to inject, the timing of fuel injection, and the ignition timing. The engine ECU 12 is connected to the motor ECU 8 and the battery ECU 9 in a manner than can be communicated to each other. The engine ECU 12, the motor ECU 8, and the battery ECU 9 share information with each other to realize the travel of the vehicle in a manner that the motor 7 and the engine 10 are controlled in a cooperative manner. Note that a power supply terminal 12a of the engine ECU 12 is connected to the low-voltage battery 2 through the power supply relay 3 as is the case with the motor ECU 8.

What is claimed is:

1. An electronic control device which is connected to a low-voltage battery that outputs a system power supply voltage and a power supply relay which is interposed on a power supply line connecting the low-voltage battery and a second electronic control device, the electronic control device comprising:
   a processing unit that controls the power supply relay; and
   a power supply monitoring unit that accepts a monitoring voltage from a contact that is disposed between an output of the power supply relay and an input of the second electronic control device, and outputs an output signal indicating a determination result whether or not the monitoring voltage is not more than a threshold value,
   wherein the processing unit is structured to start up from a sleep mode to turn on the power supply relay according to states of one or more interrupt signals, which causes the system power supply voltage to be supplied to the second electronic control device, and the processing unit starts a sampling from the power supply monitoring unit, and
   when the monitoring voltage is detected to be not more than the threshold value based on the output signal of the power supply monitoring unit, the processing unit is structured to shift to the sleep mode and stop the sampling from the power supply monitoring unit.

2. The electronic control device according to claim 1,
   wherein the processing unit is structured to perform sampling of the output signal from the power supply monitoring unit at constant intervals, count a number of times that the monitoring voltage is detected to be not more than the threshold value based on the sampling of the output signal, and shift to the sleep mode if the number of times reaches a predetermined number of times.

3. The electronic control device according to claim 1, wherein the interrupt signals are signals from an ignition switch, a communication device, a rapid charging switch, and a normal charging switch.

4. A vehicle control system for use in a vehicle having a motor as a power source, comprising:
   a high-voltage battery for driving the motor;
   a connection-destination switching unit that switches a connection destination of the high-voltage battery; and
   an electronic control device that controls the connection-destination switching unit to switch the connection destination of the high-voltage battery, thereby controlling charge and discharge of the high-voltage battery,
   wherein the electronic control device is connected to a low-voltage battery that outputs a system power supply voltage and a power supply relay which is interposed on a power supply line connecting the low-voltage battery and a second electronic control device,
   wherein the electronic control device comprises:
      a processing unit that controls the power supply relay; and
      a power supply monitoring unit that accepts a monitoring voltage from a contact that is disposed between an output of the power supply relay and an input of the second electronic control device, and outputs an output signal indicating a determination result whether or not the monitoring voltage is not more than a threshold value, and wherein the processing unit is structured to start up from a sleep mode to turn on the power supply relay according to states of one or more interrupt signals, which causes the system power supply voltage to be supplied to the second electronic control device, and the processing unit starts a sampling from the power supply monitoring unit, and when the monitoring voltage is detected to be not more than the threshold value based on the output signal of the power supply monitoring unit, the processing unit is structured to shift to the sleep mode and stop the sampling from the power supply monitoring unit.

* * * * *